United States Patent Office 3,284,496
Patented Nov. 8, 1966

3,284,496
PREPARATION OF ETHYNYLSULFUR PENTAFLUORIDE
Donald D. Coffman, West Chester, Pa., assignor to E. I. du Pont de Nemours and Company, Wilmington, Del., a corporation of Delaware
No Drawing. Filed May 16, 1962, Ser. No. 195,326
2 Claims. (Cl. 260—543)

This invention relates to, and has as its principal objects provision of, ethynylsulfur pentafluoride and its synthesis.

The intensive study of fluorine-bearing compounds which has been in progress in recent years has shown that these compounds as a class possess unusual and, also, unpredictable properties. Thus, fluorinated compositions can range from highly reactive, corrosive compounds to compositions which are substantially inert. In view of this broad spectrum of properties, fluorine-bearing compounds, as a class, are useful in widely diverse fields.

The new composition of this invention is ethynylsulfur pentafluoride represented by the formula $$HC{\equiv}CSF_5$$

The compound possesses a unique structure, i.e., it consists of two carbons joined by a triple bond, in which one carbon is bonded to a sulfur pentafluoride group and the second carbon is bonded to hydrogen. The sulfur pentafluoride group is exceptionally stable and resists degradation by hydrolysis, oxidation and other chemical reactions. The hydrogen shows properties which are characteristic of hydrogens bonded to acetylenic carbons. It is reactive and can be replaced by appropriate reagents. The compound of the invention is, therefore, a versatile intermediate for the preparation of other new and valuable products.

Ethynylsulfur pentafluoride is a colorless gas at normal atmospheric temperatures and pressures. The compound is not readily hydrolyzed by water or oxidized by air. It can be stored for prolonged periods in corrosion-resistant pressure vessels. It is, in fact, handled most readily after preparation by allowing the cooled liquid to volatilize into evacuated pressure vessels which are also cooled. The compound should be handled with the precautions normally observed for chemical products whose physiological effects have not been fully established.

The compound can be prepared by the dehalogenation of a 1,2-dihaloethenylsulfur pentafluoride wherein the halogenated ethenylsulfur pentafluoride bears halogens which are, preferably, of atomic number 17-35, i.e., chlorine and bromine.

In this process, the 1,2-dihaloethenylsulfur pentafluorides which are employed as reactants are compounds of the formula $XCH{=}CX'SF_5$ where X and X' are halogens which can be alike or different and which, preferably, are chlorine or bromine. Examples of reactants are $ClCH{=}CBrSF_5$, $BrCH{=}CClSF_5$, $BrCH{=}CBrSF_5$ and $ClCH{=}CClSF_5$. These reactants can be obtained by halogenation of a 2-haloethenylsulfur pentafluoride followed by dehydrohalogenation. Preparation of a representative reactant is illustrated in the examples. The 1,2-dihaloethenylsulfur pentafluoride is dehalogenated by contacting with a metal, preferably of Group I–B and II–B of the Periodic Table [see Handbook of Chemistry and Physics, 38th ed., pp. 394–395, Chemical Rubber Publishing Co. (1956)]. Metals which are especially preferred for use in the process are Zn and Cu. The metals can be used in any form, e.g., chips, wires, pellets, fine powders or the like. Finely divided metals are preferred to expedite the reaction.

In the operation of the process, a corrosion-resistant vessel, equipped with means for heating, stirring, adding reactants and refluxing contents, is charged with the metal and an inert liquid medium. The mixture of metal and liquid is stirred, heated mildly and the 1,2-ethenylsulfur pentafluoride, optionally in solution in an inert liquid, is added gradually. If desired, a stream of inert gas (e.g., nitrogen, argon, helium) can be passed through the vessel to expedite removal of volatile products but this procedure is not essential for operability. It is used solely for convenience. The volatile products are collected in a trap cooled conventionally, e.g., to below 0° C., preferably below —20° C.

The temperature at which the process is operated generally lies between about 50° C. and 200° C. A preferred range is 75–150° C. Pressure is not critical and the process is conducted readily at atmospheric pressure although higher or lower pressures can be used. The choice of pressure is solely a matter of convenience. Time also is not a critical factor. The reaction proceeds smoothly and rapidly and the time required is determined by the type of process used, i.e., whether continuous or batch or a combination of these two methods of operation. The time may, therefore, be quite short, less than a minute, or it may be longer, up to 4 or more hours.

Classes of compounds which can be used as inert liquid media in the dehalogenation are ethers, esters, ketones, N,N-disubstituted amides and hydrocarbons. Oxygenated liquids are preferred, particularly ethers and esters. Specific examples of liquids are dibutyl ether, dioctyl ether, dioxane, tetrahydrofuran, ethyl valerate, butyl octanoate, ethyl amyl ketone, dimethylacetamide and the like. Mixtures of liquids can be employed, for example, xylene and dioctyl ether, toluene and 1,2-dimethoxyethane. The maximum temperature at which a process is operated at atmospheric pressure is obviously controlled by the boiling point of the liquid medium and, for high temperatures, high boiling liquids are employed, e.g., di(2-ethylhexyl) succinate, methyl oleate, N,N-dioctylacetamide and the like.

In the process described above the crude reaction product is collected in a trap cooled to at least 0° C. and, preferably, lower, to assure effective condensation of the volatile components. The crude product can be purified by conventional methods, e.g., fractional distillation, gas chromatography, absorption on activated gels and the like.

The following example illustrates in more detail the preparation of ethynylsulfur pentafluoride.

Example

A. A mixture of 85 g. of $CHCl{=}CHSF_5$ and 80 g. of bromine is irradiated with a sunlamp (275 watts) for about 5 hours at 25–33° C. The reaction mixture is distilled through an efficient fractionating column under reduced pressure and 77 g. of 1,2-dibromo-2-chloroethylsulfur pentafluoride is obtained. The compound boils at 60° C./13 mm.

Analysis.—Calc'd for $CHBrCl{-}CHBrSF_5$: F, 26.2; S, 9.2 Found: F, 26.2; S, 8.23.

B. The compound (77 g.) obtained in part A is mixed with 100 ml. of acetone and 35 g. of potassium carbonate. The mixture is stirred for 7 to 7.5 hours and the temperature rises to about 35° C. The reaction mixture is filtered and the filtrate is distilled through an efficient fractionating column to obtain 43 g. of 1-bromo-2-chloroethenylsulfur pentafluoride. The product is separated into cis and trans isomers by gas chromatography.

Analysis.—Calcd. for $CHCl{=}CBrSF_5$: F, 35.52; S, 12.02; Cl, 13.26; Br, 29.88. Found (cis-form): F, 35.47; S, 11.79; Cl, 12.97; Br, 30.00. Found (trans-form): F, 35.76; S, 11.46; Cl, 12.91; Br, 30.56.

C. A reaction vessel is charged with 1.3 g. of zinc dust and 5 ml. of the dimethyl ether of diethylene glycol. The mixture is stirred and to it a mixture of 2.06 g. of trans $CHCl=CBrSF_5$ and 1 ml. of the dimethyl ether of diethylene glycol is added over a period of 9 minutes. A stream of nitrogen gas is passed through the reaction mixture while it is heated at 95–98° C. for about 22 minutes. The gas is passed into a trap cooled with a solid carbon dioxide-acetone mixture to condense and separate volatile reaction products. Approximately 0.85 g. of $CH \equiv CSF_5$, boiling at 6° C., is obtained. The product is shown by gas chromatography to be better than 99% pure.

*Analysis.*—Calcd. for $CH \equiv CSF_5$: F, 62.46; S, 21.08. Found: F, 62.05; S, 21.79.

The infrared absorption spectrum of the product shows absorption at $2.98\mu$, $4.68\mu$, $7.44\mu$ and $11.11\mu$. The nuclear magnetic resonance spectra for fluorine and for hydrogen, and analysis on the mass spectrometer provided further confirmation for the structure of the compound.

The above example illustrates the present process for preparing $HC \equiv CSF_5$. This process is generic to the preparation of the compound of the invention employing 1,2-dihaloethenylsulfur pentafluorides where the halogen is chlorine or bromine, and metals of Groups I–B and II–B, particularly copper, zinc, cadmium and mercury.

Ethynylsulfur pentafluoride is useful as an aerosol propellent for compositions to be used in space spraying or which are to be applied to surfaces, e.g. coating compositions. To illustrate, a mixture is prepared which consists of equal volumes of ethynylsulfur pentafluoride and low boiling petroleum hydrocarbons (boiling about 20–50° C.) and about 20% by weight of carbon black (paint grade). The mixture is charged into an aerosol-type vessel cooled in solid carbon dioxide-acetone mixture. An aerosol valve is attached to the vessel and it is allowed to warm to prevailing atmospheric temperature (about 25° C.). The aerosol composition is sprayed readily onto a hard cellulose-type surface to form a satisfactory black coating.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of preparing ethynylsulfur pentafluoride which comprises reacting a 1,2-dihaloethenylsulfur pentafluoride, the 1- and 2-halogens being of atomic number 17–35, with a metal selected from Groups I–B and II–B of the Periodic Table at a temperature in the range of about 75–150° C.

2. The process of preparing ethynylsulfur pentafluoride which comprises reacting 1-bromo-2-chloroethenylsulfur pentafluoride with zinc at a temperature in the range of about 75–150° C.

References Cited by the Examiner

UNITED STATES PATENTS 3,131,217  4/1964  Ray _____ 260—543

OTHER REFERENCES

Lovelace et al.: "Aliphatic Fluorine Compounds," 1958, Reinhold Publishing Corp., pp. 101–105.

Case et al.: J. Chem. Soc. (London), May 1961, pp. 2066–2070.

Case et al.: Proceedings Chem. Soc. (London), December 1960, pp. 401–402.

Wagner et al.: Synthetic Org. Chem. (1953), John Wiley and Sons, Inc., pp. 35–40 and pp. 78–80.

LORRAINE A. WEINBERGER, *Primary Examiner.*

LEON ZITVER, *Examiner.*

R. K. JACKSON, B. M. EISEN, H. C. WEGNER,
*Assistant Examiners.*